(12) United States Patent
Gomila et al.

(10) Patent No.: US 7,945,106 B2
(45) Date of Patent: **\*May 17, 2011**

(54) METHOD FOR SIMULATING FILM GRAIN BY MOSAICING PRE-COMPUTER SAMPLES

(75) Inventors: Cristina Gomila, Princeton, NJ (US); Joan Llach, Princeton, NJ (US); Jill MacDonald Boyce, Princeton, NJ (US)

(73) Assignee: Thomson Licensing, Issy les Moulineaux (FR)

( \* ) Notice: Subject to any disclaimer, the term of this patent is extended or adjusted under 35 U.S.C. 154(b) by 1020 days.

This patent is subject to a terminal disclaimer.

(21) Appl. No.: 10/572,820

(22) PCT Filed: Sep. 10, 2004

(86) PCT No.: PCT/US2004/029410
§ 371 (c)(1),
(2), (4) Date: Mar. 22, 2006

(87) PCT Pub. No.: WO2005/034518
PCT Pub. Date: Apr. 14, 2005

(65) Prior Publication Data
US 2007/0058878 A1    Mar. 15, 2007

Related U.S. Application Data

(60) Provisional application No. 60/505,146, filed on Sep. 23, 2003.

(51) Int. Cl.
G06K 9/00 (2006.01)
G06K 9/36 (2006.01)
G06K 9/46 (2006.01)
G06K 9/40 (2006.01)
G06K 9/20 (2006.01)
H04N 7/01 (2006.01)
H04N 11/20 (2006.01)
H04N 5/917 (2006.01)
H04N 5/93 (2006.01)

(52) U.S. Cl. ........ 382/254; 382/166; 382/232; 382/282; 348/441; 386/328; 386/353

(58) Field of Classification Search .................. 382/100, 382/232, 255, 166, 282; 386/328, 353; 348/441
See application file for complete search history.

(56) References Cited

U.S. PATENT DOCUMENTS
4,935,816 A    6/1990    Faber
(Continued)

FOREIGN PATENT DOCUMENTS
EP    0622000    10/1992
(Continued)

OTHER PUBLICATIONS

M. Schlockermann, S. Wittmann, T. Wedi, S. Kadono, "Film Grain Coding in H.264/AVC" JVT of ISO IEC MPEG and ITU-T VCEG JVT-1034D2, Sep. 2, 2003, XP-002311238, pp. 1-8.

(Continued)

Primary Examiner — Vu Le
Assistant Examiner — Nathan Bloom
(74) Attorney, Agent, or Firm — Robert D. Shedd; Robert B. Levy

(57) ABSTRACT

Film grain is simulated in an output image using pre-established blocks of film grain from a pool of pre-established blocks. Successive film grain blocks are selected by matching the average intensity of a block from the pool to the average intensity of a successive one of a set of M×N pixels in an incoming image. Once all of the successive pixel blocks from the image are matched to selected film grain blocks, the selected film grain blocks are "mosaiced", that is composited into a larger image mapped to the incoming image.

14 Claims, 5 Drawing Sheets

U.S. PATENT DOCUMENTS

| | | |
|---|---|---|
| 5,140,414 A | 8/1992 | Mowry |
| 5,335,013 A | 8/1994 | Faber |
| 5,374,954 A | 12/1994 | Mowry |
| 5,406,326 A | 4/1995 | Mowry |
| 5,457,491 A | 10/1995 | Mowry |
| 5,471,572 A | 11/1995 | Buchner et al. |
| 5,475,425 A | 12/1995 | Przyborski et al. |
| 5,629,769 A | 5/1997 | Cookingham et al. |
| 5,641,596 A | 6/1997 | Grau et al. |
| 5,659,382 A | 8/1997 | Rybczynski |
| 5,687,011 A | 11/1997 | Mowry |
| 5,709,972 A * | 1/1998 | Cookingham et al. ......... 430/30 |
| 5,767,860 A | 6/1998 | Zimmer et al. |
| 5,831,673 A | 11/1998 | Przyborski et al. |
| 6,587,509 B1 * | 7/2003 | Suzuki et al. ............ 375/240.29 |
| 7,065,255 B2 | 6/2006 | Chen et al. |
| 7,593,465 B2 * | 9/2009 | Jia et al. ................... 375/240.25 |
| 2001/0056568 A1 | 12/2001 | Hirotsu et al. |
| 2002/0034337 A1 | 3/2002 | Shekter |
| 2003/0043922 A1 | 3/2003 | Kalker et al. |
| 2006/0082649 A1* | 4/2006 | Gomila et al. |
| 2006/0083316 A1* | 4/2006 | Cooper et al. |
| 2006/0083429 A1* | 4/2006 | Joly |
| 2006/0133686 A1* | 6/2006 | Gomila et al. |
| 2006/0182183 A1* | 8/2006 | Winger |
| 2006/0256853 A1* | 11/2006 | Schlockermann et al. |
| 2006/0291557 A1* | 12/2006 | Tourapis |
| 2007/0034337 A1 | 2/2007 | Nishimoto et al. |
| 2007/0036452 A1* | 2/2007 | Llach et al. |
| 2007/0047658 A1* | 3/2007 | Tourapis et al. |
| 2007/0058866 A1* | 3/2007 | Boyce et al. |
| 2007/0070241 A1* | 3/2007 | Boyce et al. |
| 2007/0104380 A1* | 5/2007 | Gomila et al. |
| 2007/0117291 A1* | 5/2007 | Cooper et al. |
| 2007/0297515 A1 | 12/2007 | Gomila et al. |
| 2008/0152250 A1* | 6/2008 | Gomila et al. ................ 382/260 |

FOREIGN PATENT DOCUMENTS

| | | |
|---|---|---|
| EP | 0575006 | 12/1993 |
| EP | 1175091 | 1/2002 |
| EP | 1215624 | 6/2002 |
| GB | 2312124 | 10/1997 |
| JP | 4097681 | 3/1992 |
| JP | 8079765 | 3/1996 |
| JP | 9062718 | 3/1997 |
| JP | 2001/357090 | 12/2001 |
| WO | WO9314591 | 7/1993 |
| WO | WO9520292 | 7/1995 |
| WO | WO9722204 | 6/1997 |
| WO | WO0146992 | 6/2001 |
| WO | WO0177871 | 10/2001 |
| WO | WO2004104931 | 12/2004 |

OTHER PUBLICATIONS

Cristina Gomila, "SEI Message for Film Grain Encoding: Snytax and Results", JVT of ISO IEC MPEG and ITU-T JVT-1013 Revision 2, Sep. 2, 2003, XP-002308743, pp. 1-11.

Ohm J-R, "Digitale Bildcodierung, Vektorquantisierung Von Bildsignalen" 1995, pp. 233, 245, XP-002312555.

Christina Gomila, Alexander Kobilansky, "SEI Message for Film Grain Encoding", JVT of ISO IEC MPEG and ITU-T VCEG JVT-H022, May 23, 2003, pp. 1-14.

Search Dated Jan. 6, 2005.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China.

Yan et al, "Film Grain Noise Removal and Generation for Color Images," Department Electrical and Computer Engineers, University of Toronto, dimitris@comm.toronto.edu.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Peng et al, "Adaptive Frequency Weighting for Fine-Granularity-Scalability," Visual Communications and Image Processing 2002, Proceedings of SPIE, vol. 4671 (2002) SPIE 0277-786X/02, pp. 840-849.

Office Action from U.S. Appl. No. 10/556,834 mailed Aug. 19, 2008.
Office Action from U.S. Appl. No. 10/556,834 mailed Feb. 20, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
Notice of Non-Compliant amendment from U.S. Appl. No. 10/556,834 mailed Jun. 16, 2009.

* cited by examiner

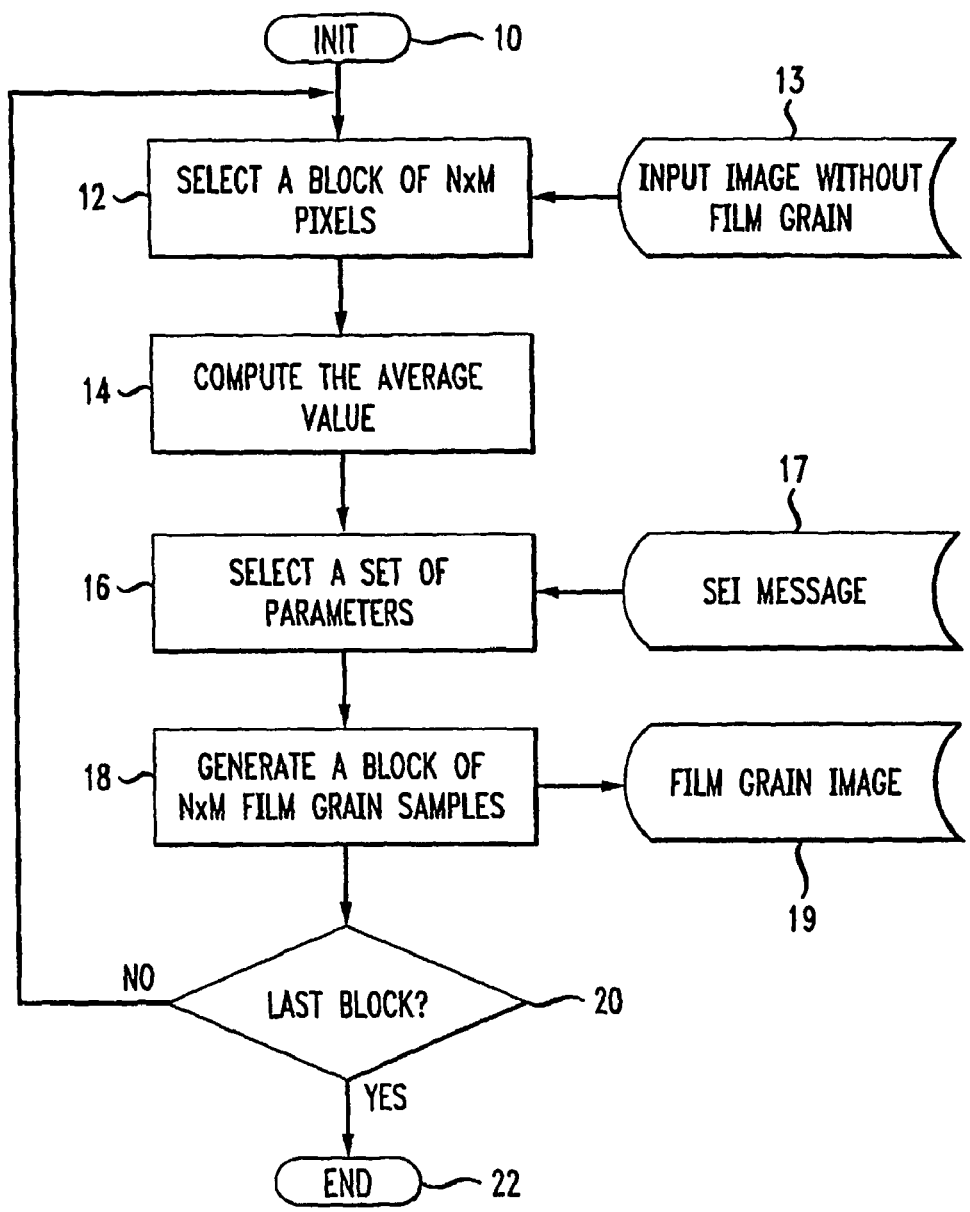

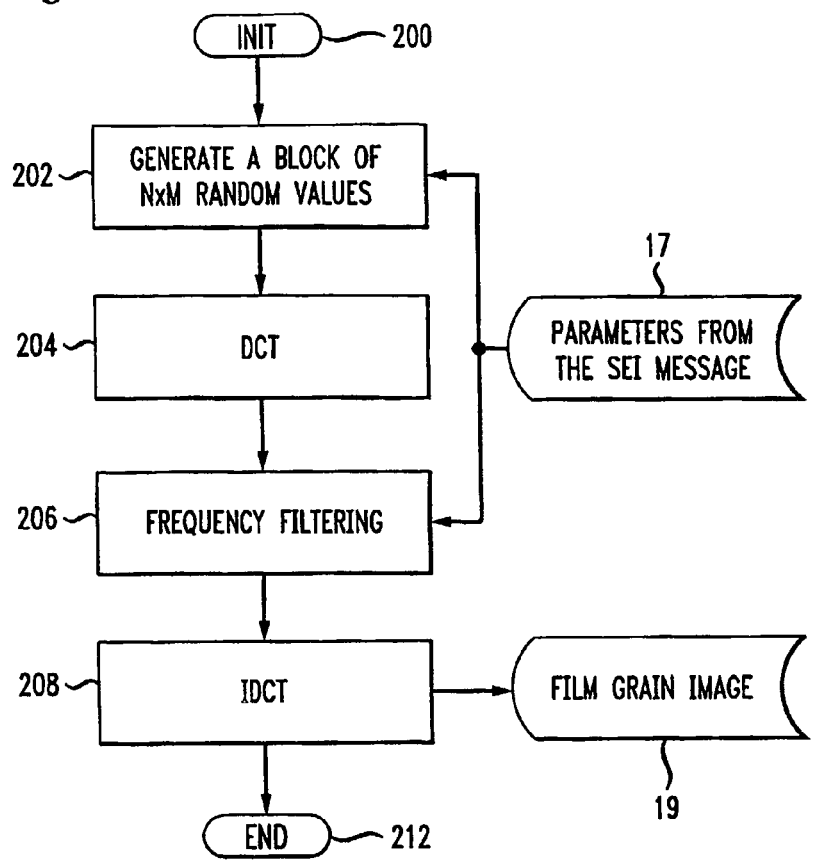
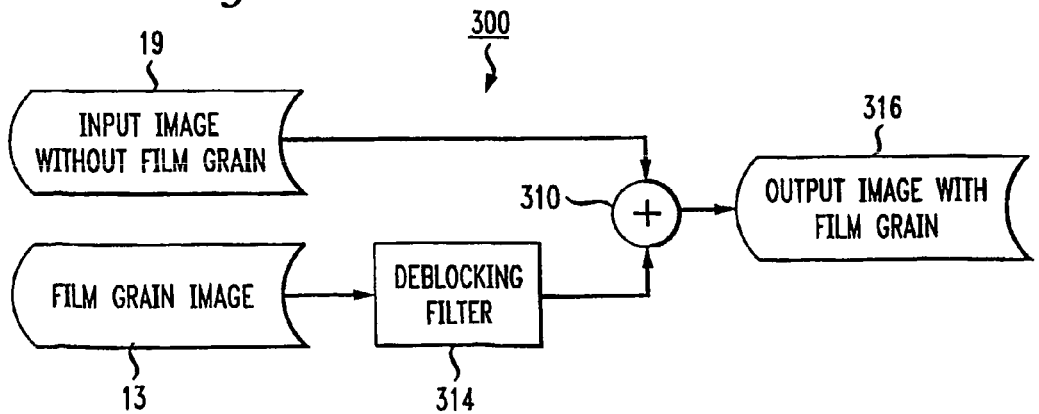

US 7,945,106 B2

METHOD FOR SIMULATING FILM GRAIN BY MOSAICING PRE-COMPUTER SAMPLES

CROSS-REFERENCE TO RELATED APPLICATIONS

This application claims priority under 35 U.S.C. 119(e) to U.S. Provisional Patent Application Ser. No. 60/505,146, filed on Sep. 23, 2003, the teachings of which are incorporated herein.

The applicants hereby claim the priority under 35 USC 119 (a) of International Application PCT/US2004/029410, filed Sep. 10, 2004, which was published in accordance with PCT Article 21(2) on Apr. 14, 2005 in English and which claims the benefit of United States provisional patent application No. 60/505,146, filed Sep. 23, 2003.

TECHNICAL FIELD

This invention relates to a technique of for simulating film grain in an image.

BACKGROUND ART

Prior publications authored by the present inventors and assigned to the present assignee proposed simulating film grain in a decoded video stream by first filtering grain out the image before compression. The video stream undergoes compression and subsequent transmission to a decoder for receipt along with a message containing information about the film grain that was present in the stream prior to compression. Upon receipt of the compressed video stream and grain-containing message, the decoder decodes the compressed stream and then restores the original grainy appearance of the image by simulating the film grain based on the content of the grain information message. The film grain message can take the form of a Supplemental Enhancement Information (SEI) message accompanying the coded video stream.

Simulating film grain in this manner provides large bit-rate savings for high quality applications where the film grain preservation becomes important. However, this method of simulating film grain increases the decoder complexity since the decoder must reproduce and blend the film grain with the decoded video stream as specified by the transmitted film grain information message.

Thus, a need exists for a technique for simulating film grain that overcomes the disadvantages of the prior art.

BRIEF SUMMARY OF THE INVENTION

Briefly, the present invention provides a method for simulating film grain in an input image block. The method commences by first computing an average value of at least one image parameter for the input image block. Thereafter, a film grain block is selected from at least one previously established pool of film grain blocks whose image parameter most closely matches the image parameter of the input image block. The selected block is then blended with the input image block.

Selecting a film grain block from the at least one pool of pre-established film grain blocks for combination with the input image reduces the complexity associated with simulating the film grain at a decoder as was done by prior methods. Further, selecting a film grain block from the at least one pool of pre-established film grain blocks reduces artifacts that otherwise might arise when transitioning between independently generated film grain blocks.

BRIEF DESCRIPTION OF THE DRAWINGS

FIG. 1 depicts the steps of a prior art method for film grain simulation by mosaicing independently generated film grain samples;

FIG. 2 depicts the steps of a prior art method for generating the film grain blocks for the method of FIG. 1;

FIG. 3 depicts a part of a prior art decoder for generating a film-grain containing output image;

DETAILED DESCRIPTION

Figure 4:
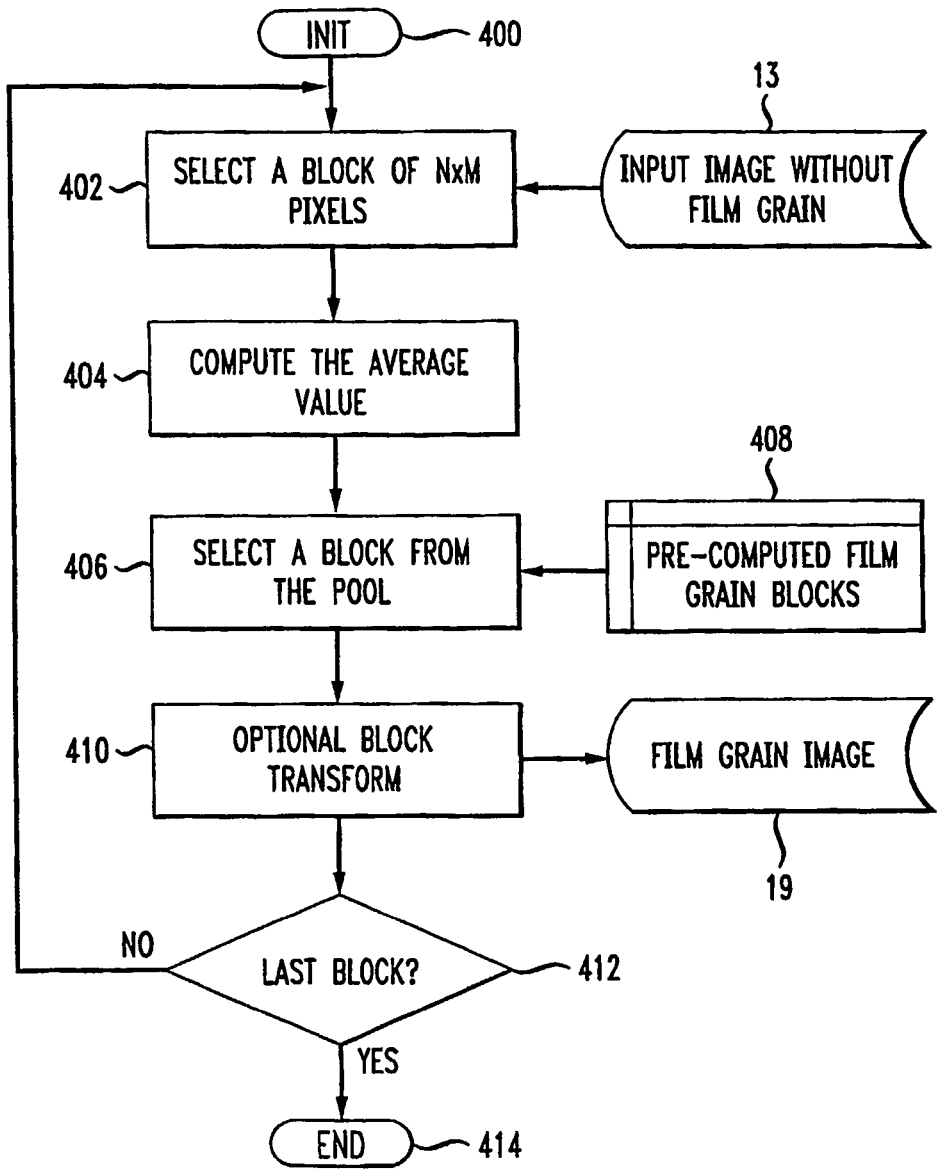
FIG. 4 depicts the steps of a method in accordance with an illustrative embodiment of the present principles for simulating film grain by mosaicing pre-computed blocks of film grain.

In accordance with the present principles, simulation of film grain in an image from occurs by mosaicing pre-established individual film blocks. The term "mosaicing" of the individual film blocks implies the building of a composite image by blending individual film grain blocks that are smaller in size. To appreciate the advantages of film grain simulation by mosaicing pre-established film grain samples, a description of the prior art film grain simulation process will prove helpful.

FIG. 1 depicts the steps of a prior art method for simulating film grain on a block-by-block basis. The method of FIG. 1 commences by first initializing system variables during step 10. During step 12, a successive one of a set of blocks of N×M pixels (where N and M are each integers greater than zero) is read from in an input image 13. Reading of the blocks during step 12 occurs in raster-scan order. Prior to step 12, the input image 13 typically undergoes filtering to remove or at least attenuate the film grain followed by decomposition to yield non-overlapping blocks of N×M pixels. Initial compression of the image can itself serve to remove or attenuate film grain. In some instances the input image will not have any initial film grain, either because the image was digitally captured and/or, computer generated. Under such circumstances, adding grain where none existed will enhance the image.

Following step 12, the numeric average of the image intensity, is computed during step 14 for the just-read block. Next, film grain parameter selection occurs during step 16. The selection is made from a set of film grain parameters provided in a film grain message 17 accompanying the input image in accordance with the average intensity value computed during step 14. Typically the film grain message 17 takes the form of a Supplemental Enhancement (SEI) Message, and for that reason, the term "SEI message" will appear hereinafter when referring to the message containing film grain information. Because film grain characteristics can vary depending on the intensity level, the selection carried out during step 16 can yield different film grain parameters depending on the average intensity measured on the extracted image block.

Using the film grain parameters selected during step 16, an N×M pixel block of film grain samples is generated during step 18 for use in creating a film grain image 19. Each of the film grain blocks generated through this process undergoes storage and compositing to yield a film grain image that maps to the size of the original input image. This composition process constitutes mosaicing as discussed earlier. Following step 18, a check occurs during step 20 whether the block selected during step 12 constitutes the last block of the input image 11. If additional blocks remain, program execution branches to step 12 and those following it. Otherwise, step 22 occurs and the process ends FIG. 2 depicts the individual steps that collectively comprise the step 18 of FIG. 1 for generating block of N×M film grain samples. The method of FIG. 2 commences upon execution of step 200 during which initialization of system variables occurs. Thereafter, generation of a block of N×M random values occurs during step 202 using one or more parameters obtained from the SEI message 17. The block generated during step 204 undergoes a Discrete Cosine Transformation (DCT) during step 204 to obtain a corresponding set of N×M frequency coefficients. Other transforms, besides DCT could also be used. The coefficients computed during step 204 undergo frequency filtering during step 206, with the filtering coefficients computed in accordance with one or more of the parameters contained in the SEI message 17. The frequency filtering controls the size of the simulated grain. The frequency-filtered coefficients undergo an Inverse Discrete Cosine Transform (IDCT) during step 208 to yield the film grain image 19. This process requires specification of the noise deviation as well as the high and low cut frequencies that control the filtering process in the frequency domain. For video coding applications, the SEI message 17 typically conveys such information. Following step 208, the process ends.

FIG. 3 depicts a block schematic diagram of a portion of a decoder 300 that accomplishes film grain blending with the original image. A summing block 310 within the decoder 300 receives a decoded input image 13 at a first input. The film grain image 19 of FIG. 2 undergoes deblocking at a deblocking filter 314 prior to receipt at the second input of the summing block 310. The summing block 310 sums the input image 13 and the film grain image 19 to yield an output image 316 that contains film grain. Since the individual blocks of film grain have been generated independently, artifacts can be perceived at the transitions between blocks. Thus, the deblocking filter 314 becomes important to reduce the visual artifacts resulting from the film grain mosaicing.

As thus described, the prior art method for film grain simulation requires the generation of film grain for blending with each processed block of pixels of the input image. In contrast, the film grain simulation in accordance with the present principles achieves greater efficiency by limiting the film grain generation by way of a pool creation process in which a limited number of film grain blocks are computed. This approach strongly reduces the computational complexity of the film grain simulation process.

FIG. 4 depicts the steps of a method in accordance with a first embodiment of the present principles for film grain simulation. As discussed in greater detail hereinafter, the film grain simulation method of FIG. 5 advantageously avoids film grain generation on the fly by selecting individual pre-computed film grain blocks from a pool of such blocks. The method of FIG. 4 commences by first initializing system variables during step 400. Next a successive block of N×M pixels is read during step 402 from the input image 13. Reading of the blocks during step 402 occurs in raster-scan order. As discussed above, the input image 13 typically will have had all of its grain removed or attenuated and will have been decomposed into non-overlapping blocks of N×M pixels (where N and M are integers each greater than zero). Initial compression of the image can itself serve to remove or attenuate film grain. In some instances the input image will not have any initial film grain, either because the image was digitally captured and/or, computer generated. Under such circumstances, adding grain where none existed will enhance the image.

Following step 402, the average value of an image parameter, typically, the average intensity value is computed during step 404 for the block just read during step 402. Next, a film grain block is selected during step 406 from at least one pool of pre-established film grain blocks pre-computed in the manner described hereinafter with respect to FIG. 5. Rather than rely on a single pool of film grain blocks, multiple pools could exist from which selection could occur dependent on the average image intensity or dependent on one or more other image parameters. When more than one block is available for the same intensity level and color component, a selecting criterion should be specified. For example, pseudo-random selection of blocks from the pool could occur to avoid the creation of patterns when a reduced number of blocks are available. Use can also be made of transformed copies of the set of available film grain blocks.

Following block selection during-step 406, the selected block typically undergoes a transform during step 410 to yield the film grain image block 19 for blending with the film grain image. Following step 410, a check occurs to determine whether additional image blocks remain during step 412. If additional image blocks remain, program execution branches to step 402 and those following it. Otherwise, program execution ends during step 414.

Figure 5:
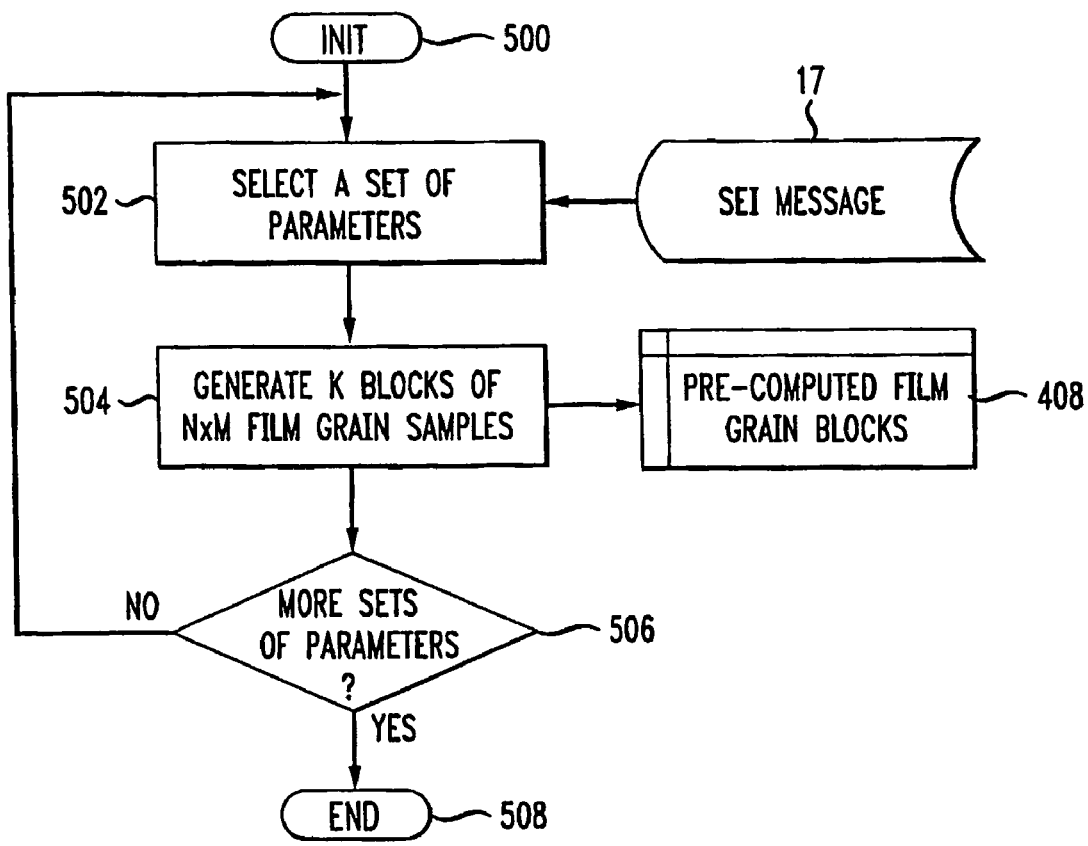
FIG. 5 depicts the steps of a method in accordance with an illustrative embodiment of the present principles for pre-establishing the film grain blocks used in the method of FIG. 4.

FIG. 5 illustrates the steps of a: method in accordance with the present principles for generating the pre-established film grain blocks 408 of FIG. 4. The method of FIG. 5 commences by first performing initialization during step 500 to reset all system variables. Next, selection of a set of film grain parameters from the SEI message 17 occurs during step 502. Thereafter, a set of K blocks of film grain samples (where K is an integer greater than zero) is generated for each set of parameters in the SEI message 17 during step 504. Different sets of parameters will specify different color components and different intensity levels. A particular implementation with K=1 results in the lowest computational requirements, generating only one block of film grain per set of parameters. However, to avoid the creation of patterns, it is preferable to use of a larger number of blocks or even a different number of blocks for different intensity levels.

Following step 504, a check occurs during step 506 to determine whether additional parameter sets remain. If additional sets remain, program execution branches to step 502 and those following it. Otherwise, program execution ends during step 508.

The process described with respect to FIG. 5 for creating a pool of pre-established film grain blocks remains completely decoupled from the film grain blending that occurs in the decoder 10 as described in FIG. 3. Despite the computational advantage of anticipating film grain generation, the film grain simulation method of FIG. 4 incurs the inconvenience of remaining unaware whether the input images will make use of all the blocks stored in the pool.

Figure 6:
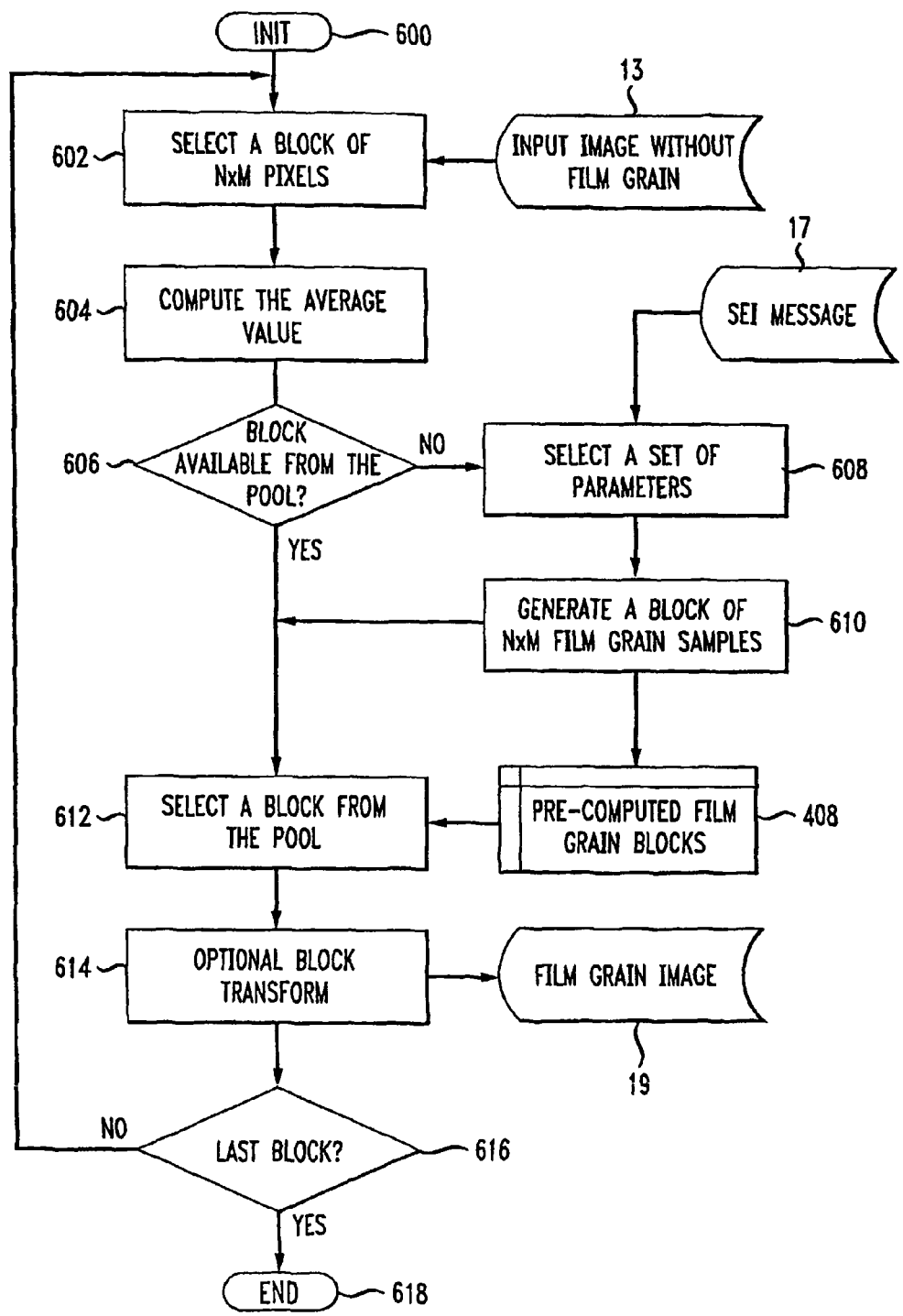
FIG. 6 depicts the steps of a method in accordance with another illustrative embodiment of the present principles for simulating film grain by mosaicing film grain blocks obtained from input image characteristics.

FIG. 6 illustrates an alternative embodiment of a film grain simulation method according to the present principles that makes use of the characteristics of input images. As will become better understood hereinafter, the film grain method of FIG. 6 does not create a pool of film grain blocks a priori for all the possible intensity levels present in the SEI message 17.

Instead, the method of FIG. 6 undertakes creation of a limited pool of film grain blocks and undertakes to update of the pool of blocks depending on the input image characteristics.

The method of FIG. 6 commences by-first performing initialization during step 600 to reset all system variables. Step 602 follows step 600 during which selection of a block of N×M pixels from the input image 13 occurs. Thereafter, the-average of at least one image parameter (e.g., the average of the image intensity) of the previously selected image block is computed during step 604. During step 606 a check occurs for the availability of a film grain block whose average intensity most closely matches the average intensity of the selected image block. If no such block exists, then program execution branches to step 608, a set of parameters are selected from the SEI message 17. Next, an N×M film grain block is generated from the selected parameters during step 610. The block generated during step 610 now enters the pool of pre-computed film grain blocks 408. Step 612 follows step 610. Step 612 also follows step 606 upon a determination that a film grain block in the pool has an average intensity mostly closely matching that of the selected image block. During step 612, selection of the most closely matching film grain block occurs from the pool 408 of film grain blocks. Next, the selected block typically undergoes a transform during step 614 for mosaicing with the previously selected blocks to yield the film grain image 19. In this way, the transform block is blended with the film grain image. A determination occurs during step 616 whether the block selected during step 602 constitutes the last block. If not, program execution branches to step 602. Otherwise, program execution ends during step 618.

The above-described method can estimate if blocks are not available not only when the pool 408 is empty, but also if the existing blocks have been recently used for blending. Other criteria for managing the pool creation and update process could also be envisaged. The method of FIG. 6 could progressively create and/or update the pool 408 of pre-established film grain blocks depending on the characteristics of the input images. For example, the pool 408 could be organized to arrange a larger number of blocks within the most prevalent intensity levels to avoid the creation of visual patterns. According to this strategy, the distribution of film grain blocks in the pool 408 would progressively match variations in the image characteristics related to darkening or lightening.

The foregoing describes a technique for simulating film grain in an image.

What is claimed is:

1. A method for simulating film grain in an input image block, in which film grain has been at least partially filtered out, comprising the steps of:
    (a) computing an average value of at least one image parameter for the block;
    (b) selecting a film grain block from at least one previously established pool of film grain blocks whose image parameter most closely matches the average value of the image parameter of the input image block;
    (c) blending the selected film grain block with the input image block.

2. The method according to claim 1 further comprising the step of de-blocking the selected film grain block prior to blending with the input image block.

3. The method according to claim 1 wherein the previously established film grain blocks are organized in the at least one pool based on image intensity.

4. The method according to claim 1 further including the step of updating the at least one pool in accordance with characteristics of the input image.

5. The method according to claim 3 where a different film grain block is selected for at least one of a different color component.

6. The method according to claim 1 further including the step of transforming the selected block prior to the blending step.

7. The method according to claim 1 further comprising the step of selecting a film grain block from among a plurality of pools of film grain blocks.

8. A method for simulating film grain in an input image from which the film grain has at least been attenuated and been decomposed in into input image blocks, comprising the steps of:
    (a) selecting a successive one of a set of input image blocks;
    (b) computing an average value of at least one image parameter for the successive block;
    (c) selecting, from among at least one pool of previously established film grain blocks, a film grain block having image parameter most closely matches the average value of the at least one image parameter of the successive block;
    (d) repeating steps (a)-(c) for all the pixel blocks in the image; and
    (e) blending the selected film grain blocks to yield an output image with film grain.

9. The method according to claim 8 wherein the previously established film grain blocks are organized in the at least one pool based on image intensity.

10. The method according to claim 8 further including the step of updating the at least one pool of pre-established film grain blocks in accordance with characteristics of the input image.

11. The method according to claim 8 where a different film grain block is selected for at least one of a different color component.

12. The method according to claim 7 further including the step of transforming the selected block prior to repeating steps (c) - (d).

13. The method according to claim 8 further comprising the step of selecting a film grain block from among a plurality of pools of film grain blocks.

14. The method according to claim 8 further comprising the step of de-blocking the successive film grain block prior to repeating steps (c) - (d).

* * * * *